(12) United States Patent
Chagoly et al.

(10) Patent No.: US 7,631,073 B2
(45) Date of Patent: Dec. 8, 2009

(54) METHOD AND APPARATUS FOR EXPOSING MONITORING VIOLATIONS TO THE MONITORED APPLICATION

(75) Inventors: Bryan Christopher Chagoly, Austin, TX (US); Nduwuisi Emuchay, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 988 days.

(21) Appl. No.: 11/044,465

(22) Filed: Jan. 27, 2005

(65) Prior Publication Data

US 2006/0168199 A1 Jul. 27, 2006

(51) Int. Cl.
*G06F 15/173* (2006.01)
(52) U.S. Cl. .................................. 709/224; 709/223
(58) Field of Classification Search .................. None
See application file for complete search history.

(56) References Cited

U.S. PATENT DOCUMENTS

| | | | |
|---|---|---|---|
| 5,872,976 A | 2/1999 | Yee et al. ............ 395/704 |
| 6,141,699 A | 10/2000 | Luzzi et al. ........... 709/331 |
| 6,147,975 A | 11/2000 | Bowman-Amuah | |
| 6,341,303 B1 | 1/2002 | Rhee et al. ............ 709/104 |
| 6,349,394 B1 * | 2/2002 | Brock et al. ........... 714/47 |
| 6,366,845 B1 | 4/2002 | Kannonji ............. 701/96 |
| 6,466,932 B1 | 10/2002 | Dennis et al. ............ 707/3 |
| 6,728,748 B1 | 4/2004 | Mangipudi et al. ...... 709/105 |
| 6,738,813 B1 * | 5/2004 | Reichman ............. 709/224 |
| 6,738,933 B2 | 5/2004 | Fraenkel et al. | |
| 6,748,593 B1 | 6/2004 | Brenner et al. ......... 718/105 |
| 6,983,362 B1 * | 1/2006 | Kidder et al. ........... 713/1 |
| 7,249,179 B1 * | 7/2007 | Romero et al. ........ 709/226 |
| 2002/0068545 A1 * | 6/2002 | Oyama et al. ......... 455/406 |
| 2002/0087611 A1 | 7/2002 | Tanaka et al. ........... 709/1 |
| 2002/0103663 A1 | 8/2002 | Bankier et al. | |
| 2002/0167942 A1 | 11/2002 | Fulton ................ 370/352 |
| 2002/0194251 A1 | 12/2002 | Richter et al. ......... 709/105 |
| 2003/0005024 A1 | 1/2003 | Grumann .............. 709/102 |
| 2003/0115244 A1 | 6/2003 | Molloy et al. .......... 709/105 |
| 2003/0208523 A1 * | 11/2003 | Gopalan et al. ........ 709/201 |
| 2004/0025162 A1 | 2/2004 | Fisk .................. 718/105 |
| 2004/0111725 A1 | 6/2004 | Srinivasan et al. ...... 718/105 |
| 2005/0108444 A1 * | 5/2005 | Flauaus et al. .......... 710/15 |

(Continued)

OTHER PUBLICATIONS

Hongjun, Li, John S. Baras, George Mykoniatis, "An Automated, Distributed, Intelligent Fault Management System for Communication Networks",Technical Report, 1999, pp. 1-6, http://hdl.handle.net/1903/6087.

Fox et al., "Cluster-Cased Scalable Network Services", SIGOPS Oper. Syst. Rev. 31, Dec. 5, 1997, pp. 78-91, http://doi.acm.org/10.1145/296005.266662.

(Continued)

*Primary Examiner*—Krisna Lim
*Assistant Examiner*—Tariq S Najee-Ullah
(74) *Attorney, Agent, or Firm*—Yee & Associates, P.C.; Jeffrey S. LaBaw

(57) ABSTRACT

A method and system for exposing monitoring violations to monitored applications is provided. A monitored application may detect that a monitoring application has been applied to monitor a transaction. Based on a defined policy or a threshold within policy, the monitored application may determine if the transaction is in a violation state. If the transaction is in a violation state, the mechanism of the present invention enables the monitoring application to notify the monitored application, such that the monitored application may take corrective action to correct the violation.

3 Claims, 5 Drawing Sheets

U.S. PATENT DOCUMENTS

2005/0204041 A1* 9/2005 Blinn et al. .................. 709/225
2005/0251574 A1* 11/2005 Chagoly et al. ............. 709/227
2006/0116918 A1* 6/2006 Flora et al. ..................... 705/8
2006/0290519 A1 12/2006 Boate et al.
2007/0180490 A1* 8/2007 Renzi et al. .................... 726/1

OTHER PUBLICATIONS

Blaisdell et al. Method and Apparatus for Redirecting Transactions Based on Transaction Response Time Policy in a Distributed Environment.

* cited by examiner

METHOD AND APPARATUS FOR EXPOSING MONITORING VIOLATIONS TO THE MONITORED APPLICATION

RELATED APPLICATIONS

The present invention is related to the following application entitled, "Method and Apparatus for Redirecting Transactions Based on Transaction Response Time Policy in a Distributed Environment", Ser. No. 11/044,463, filed on Jan. 27, 2005. The above related application is assigned to the same assignee, and incorporated herein by reference.

BACKGROUND OF THE INVENTION

1. Technical Field

The present invention relates to an improved data processing system. In particular, the present invention relates to a monitored application in a data processing system. Still more particularly, the present invention relates to exposing monitoring violations to monitored applications in a data processing system.

2. Description of Related Art

Performance monitoring is often used in optimizing the use of software in a system. A performance monitor is generally regarded as a facility incorporated into a processor to assist in analyzing selected characteristics of a system by determining a machine's state at a particular point in time. One method of monitoring system performance is to monitor the system using a transactional-based view. In this manner, the performance monitor may access the end-user experience by tracking the execution path of a transaction to locate where problems occur. Thus, the end user's experience is taken into account in determining if the system is providing the service needed. Another method of monitoring system performance is to monitor the system based on resources. For example, by monitoring usage of the central processing unit (CPU) or memory consumption, problem areas may be identified based on the amount of resources consumed by each process currently running in the system.

Transaction monitoring systems, such as Tivoli Monitoring for Transaction Performance™ (hereafter TMTP), monitor the availability and performance of Web-based services and operating system applications. Such systems capture detailed transaction and application performance data for all electronic business transactions. In this way, every step of a user transaction as it passes through an array of hosts, systems, applications, Web and proxy servers, Web application servers, middleware, database management software, and legacy back-office software, may be monitored and performance characteristic data compiled and stored in a data repository for historical analysis and long-term planning.

One way in which this data may be compiled in order to test the performance of a system is to simulate user transactions and collect "what-if" performance data to help assess the health of electronic business components and configurations. In addition to high level user transactions, sub-transactions of a user transaction may also be monitored. For example, from a user request of a Web page in a Web browser, to a servlet in a Web server, to an EJB within an application in an application server, to a Java class that implements the EJB and to a Java method of the Java class.

Transaction monitoring systems link user transactions and sub-transactions using correlating tokens, such as ARM (Application Response Measurement) correlators. ARM is a standard for measuring response time and status of transactions. ARM employs an ARM engine, which records response time measurements of the transactions. For example, in order to measure a response time, an application invokes a 'start' method using ARM, which creates a transaction instance to capture and save a timestamp. After the transaction ends, the application invokes a 'stop' method using ARM to capture a stop time. The difference between a start and stop time is the response time of the transaction. More information regarding the manner by which transaction monitoring systems collect performance data, stores it, and uses it to generate reports and transaction graph data structures may be obtained from the Application Response Measurement (ARM) Specification, version 4.0, which is hereby incorporated by reference.

In addition, transaction monitoring systems pass correlating tokens in user transactions to allow for monitoring the progress of the user transactions through the system. As an initiator, a transaction may invoke a component within an application and this invoked component can in turn invoke another component within the application. Correlating tokens are used to "tie" these transactions together.

In addition to correlating tokens, transaction monitoring systems also leverage a programming technique, known as aspect-oriented programming (AOP), for defining start and stop methods of the transactions in order to measure performance. Aspect-oriented programming techniques allow programmers to modularize crosscutting concerns by encapsulating behaviors that affect multiple classes into reusable modules. In other words, AOP identifies common problems or traits in multiple modules or objects and applies a common behavior across all of the modules without rewriting the code individually for each and every module.

Some transaction monitoring systems, such as TMTP, employ an implementation of the aspect-oriented programming technique, such as just-in-time-instrumentation (JITI), to weave response time and other measurement operations into applications for monitoring performance. JITI provides the ability to manipulate the byte code of a monitored Java application at runtime in a manner similar to Byte Code Engineering Library (BCEL). BCEL allows developers to implement desired features on a high level of abstraction without handling all the internal details of the Java class file format. JITI adds new byte codes to the monitored application classes to provide hooks, such that the monitoring application may run in a manner similar to aspect-oriented programming tools, such as AspectJ.

Using JITI or other prior art instrumentation techniques and ARM correlators, transaction monitoring systems allow users to dynamically monitor transactions and to define thresholds against those transactions. A threshold is a limit of performance or availability that is acceptable by the user. For example, a user may define a threshold of response time, which is the highest number of seconds a transaction may take. In this way, companies can specify availability of their applications at a certain service level agreement (SLA). If the response time measured exceeds the threshold of a policy, transaction monitoring systems notify the user of the performance problem, and the user may take appropriate action to correct the problem. The use of transaction monitoring systems helps decompose large business transactions into hundreds of sub-transactions. In addition, performance problems may be identified using the thresholds.

While transaction monitoring systems provide prompt and automated notification of performance problems when they are detected, this notification is only available to the monitoring application itself. The application that is being monitored, or the monitored application, does not have the capability to detect that it is being monitored by a monitoring component. In addition, the monitored application does not have the ability to detect a transaction performance violation.

An example of a monitored application is a user application, such as a banking application that is implemented as a J2EE application running on a WebSphere Application Server. Websphere Application Server, a product available from International Business Machines Corporation, is a J2EE application server that provides an operating environment for e-business applications to perform transactions over the Internet. Currently, the user has to launch the monitoring application, such as transaction monitoring systems, to view the transactions and the logging that is associated with the monitored application.

Therefore, it would be advantageous to have an improved method, apparatus, and computer instructions for exposing monitoring violations to the monitored application, such that the monitored application may autonomically detect that a monitored application is applied and take custom corrective actions to solve the problem if a violation occurs.

SUMMARY OF THE INVENTION

A method, apparatus, and computer instructions is provided for exposing monitoring violations to monitored applications. The present invention provides a mechanism for a monitored application to detect if a monitoring application has been applied to it. If a policy or a threshold of a policy is defined for a transaction to which the monitored application is set to monitor, the mechanism of the present invention notifies a management agent, via a monitoring engine, at run time to determine whether the transaction is in a violation state. If the transaction is in a violation state, the monitored application queries the monitoring engine for the transaction's status. In turn, the monitoring application notifies the monitored application of the status, such that the monitored application may take corrective actions to correct its performance.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
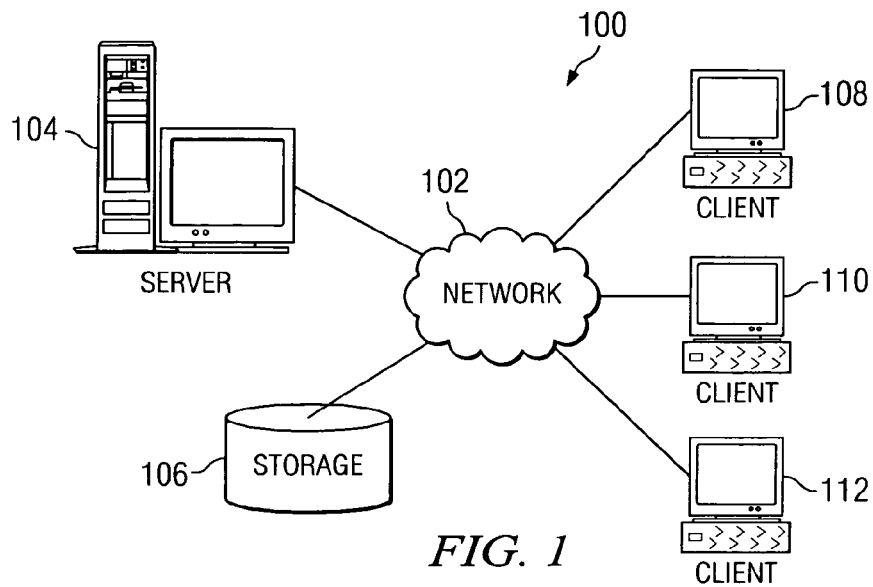
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
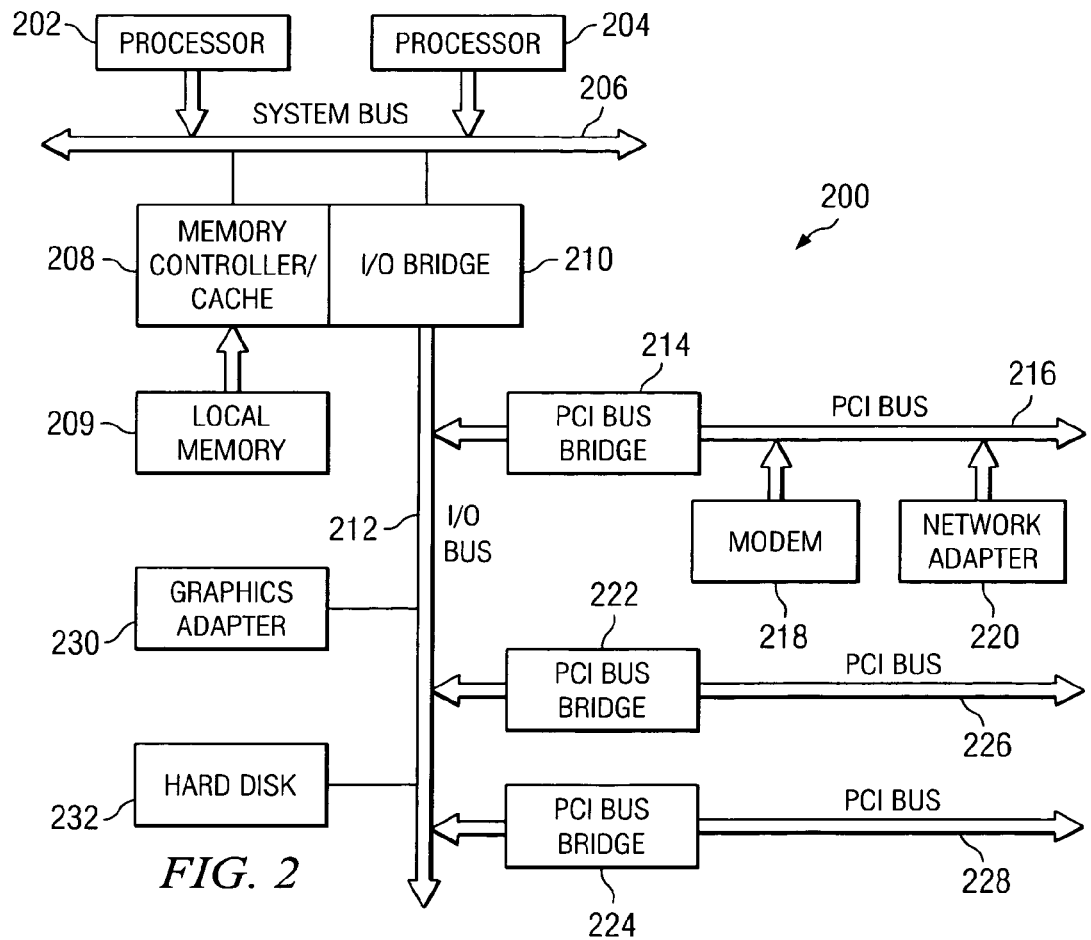
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, New York, running the Advanced Interactive Executive (AIX) operating system or LINUX operating system.

Figure 3:
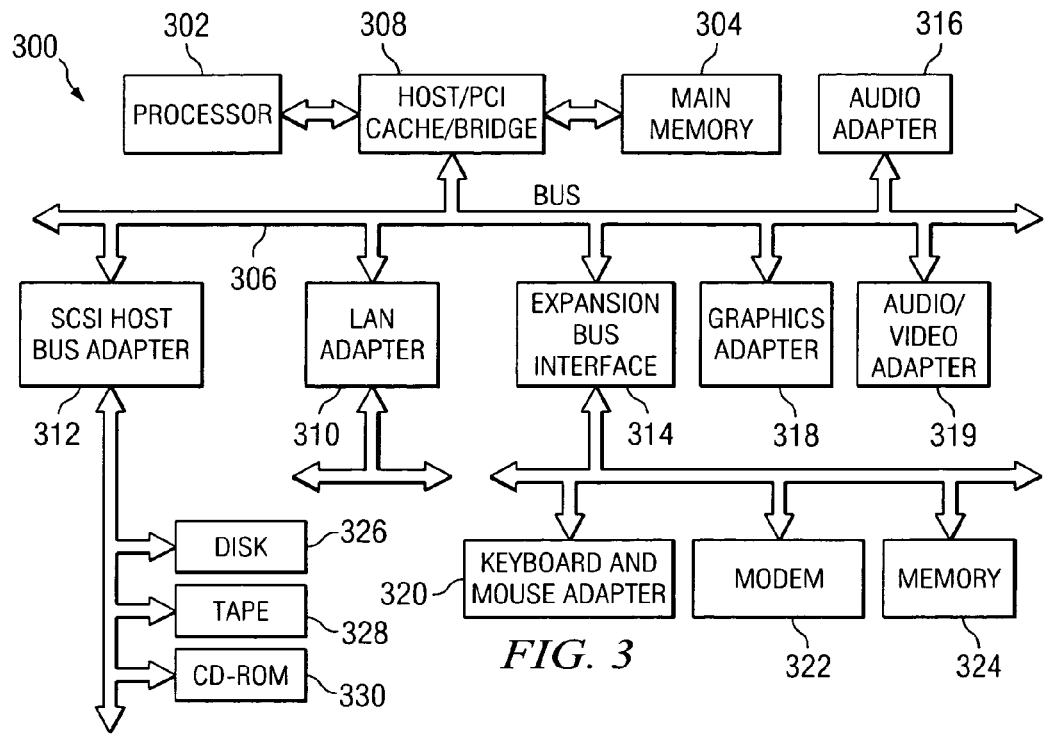
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object-oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, apparatus, and computer instructions for exposing monitoring violations to monitored applications. In a preferred embodiment, the mechanism of the present invention enables a monitored application to interact with the monitoring application in case of a violation. A violation is a violation of monitoring policy, for example, if the response time exceeds the threshold defined by the user.

Using the mechanism of the present invention, an administrator of the monitored application may configure the monitored application by first deploying a monitoring component to the application server where the monitored application resides. In a preferred embodiment, the monitoring component may be instrumented using prior art techniques, such as JITI or J2EE monitoring component, to weave code into a monitored application, such that behaviors may be added in front of and right after a method of interest without modifying the method itself.

In addition to using aspect-oriented programming techniques, such as JITI or J2EE monitoring component, the present invention may use other prior art instrumentation techniques that take an application previously developed and overlay a monitoring component on top of the monitored application at run time to interact with a monitoring application.

In one embodiment, a monitoring component is used to weave methods in front of an initiation of a transaction being monitored and right after a transaction is complete. The methods weaved in turn gather measurement information, such as, the response time and other measurement data, from the ARM engine and provide the information to the monitored application at run time. Alternatively, instead of transactions, the monitoring component may be used to weave methods in front of an initiation of an application or process being monitored and right after the application or process is complete. In turn, weaved methods gather other performance measurements, such as CPU usage and memory consumption, from a performance monitoring engine and provide the measurements to the monitored application at run time.

Once the monitoring component is deployed, an administrator may define a policy and thresholds within the policy for a transaction to be monitored when the monitored application is executed. A user may define a policy for an overall transaction or subtransactions via a graphical user interface. For example, a user may specify a policy for a regular expression, such as a Uniform Resource Locator (URL), a Web service, or an application programming interface (API). For each policy defined, the user may specify one or more thresholds associated with the policy.

The threshold is a limit of performance that is acceptable by the user, for example, a response time, a CPU usage, or memory consumption. When the policy is defined, the administrator has to specify a regular expression to match each of the identified elements that uniquely identifies the transaction to be monitored.

Figure 5:
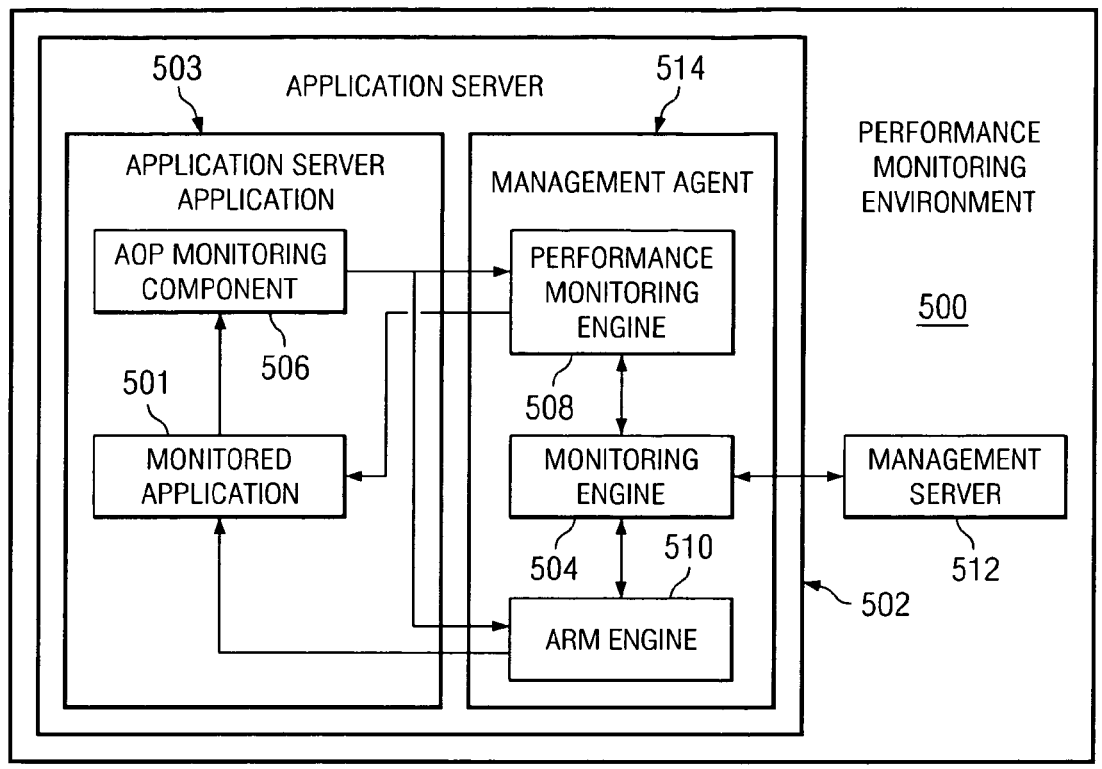
FIG. 5 is a diagram illustrating interactions between components for exposing monitoring violations to monitored applications in accordance with a preferred embodiment.

After a threshold and a transaction are defined, the management server sends an update of the policy and thresholds to the management agent. The management agent is an interface to the monitoring engine on the monitored server. The management agent records the transaction on the monitoring server. In turn, the monitoring server notifies a monitoring application, such as an ARM engine, of the policy and the set thresholds. More detail of the interactions between the management agent, the monitoring server and the monitoring application are depicted in FIG. 5 below.

In a preferred embodiment, an ARM engine is used to measure response time measurements. Alternative to the ARM engine, the monitoring server may notify a different type of performance monitoring engine to measure resource usage of the system. When the user runs a monitored application in an application server, such as WebSphere Application Server, the user initiates the monitored application to generate transactions using monitoring engine calls that are inserted by the monitoring component. The monitoring component intercepts the transaction calls and performs the following steps to generate the transactions.

The monitoring component first verifies that all dependencies of the monitored application exist before proceeding. If all dependencies exist of the monitored application, the monitoring component supplies the ARM engine or other types of performance monitoring engine with information necessary to uniquely identify the current transaction, for example, a transaction identifier (ID). The monitoring component then queries the ARM engine for a corresponding ARM correlator for the current transaction. A corresponding ARM correlator may be obtained by examining a policy mapper in the monitoring engine, and determining if the current transaction matches a defined policy. A policy mapper is a mechanism on the management agent that stores policies associated with transactions as defined by an administrator.

If a policy matches the current transaction, the ARM engine returns a valid ARM correlator. Otherwise, the ARM engine returns a null correlator, which signifies to the monitoring application that the current transaction is not being monitored. If a valid ARM correlator is obtained, the monitoring component invokes a monitoring engine call to start the transaction, for example, ARM_start.

In a preferred embodiment, once the transaction is started, the mechanism of the present invention invokes a 'getCurrentStatus' method of the ARM correlator to return a current status of the transaction. If the current status of the transaction matches the policy defined by the administrator, the mechanism of the present invention creates a new instance of a transaction class with a transaction identifier and initiates the instance with instance values. The instance of the transaction is then returned to the monitored application.

At run time, the monitored application may query the status of the transaction from the monitoring application using an interface provided by the present invention. The interface provided by the present invention provides a number of methods for the monitored application to interact with the monitoring application and the performance monitoring engine, such as the ARM engine. These methods allow a monitored application to start, abort, or stop a transaction or subtransaction, as well as returning a current status of the transaction from the performance monitoring engine based on a transaction identifier. The monitored application queries the status by invoking a 'getStatus' method on the transaction instance of the interface provided by the present invention. The 'getStatus' method in turns calls the 'getCurrentStatus' of the ARM correlator as mentioned above to return a current status of the transaction or a status code. The status code indicates whether the transaction is in a violation state.

Alternative to querying the status from the monitoring application, the interface or the present invention also provides a call back method for the monitoring application to notify the monitored application of the transaction status. In a preferred embodiment, if the status code is greater than 0, the transaction is in a violation state, meaning that a threshold has been violated. For example, the user tries to retrieve data from a database. However, the database response is slow due to a performance issue. Therefore, a status code of greater than 0 is returned.

At this time, the monitored application may take corrective actions, for example, the monitored application may alert the monitoring application to abort the transaction if an error is encountered during execution of the monitored application. The monitoring application may perform other corrective actions. Corrective actions performed by the monitoring application are described in further detail in the related patent application entitled "Method and Apparatus for Redirecting Transactions Based on Transaction Response Time Policy in a Distributed Environment," attorney docket number AUS920040754US1, incorporated by reference above.

At the same time, the monitoring component intercepts the call and invokes a 'ARM_abort' method to abort the transaction. The monitored application may then take its own corrective action. For example, the monitored application may stop the transaction that queries the database and reroute the request to a different database via an alternative code path. In addition, the monitored application may change the logic within to behave differently based on its performance, generate exceptions to be handled by other components in the monitored application if it is performing poorly, redirect to alternative or backup resources downstream of performance problem, generate alternate functionalities instead of performing full functionalities, restart resources downstream, and restart itself.

However, if the transaction is not in a violation state, the transaction is within its service level agreement (SLA) and the transaction continues as normal. Once the transaction is complete, the monitoring component may intercept and invoke a 'ARM_stop' method to stop the transaction.

Thus, by allowing the monitored application to query the transaction status at run time, the monitored application may detect whether a transaction is being monitored by the monitoring application and make adjustments according to its performance. In addition, the monitored application may use the present invention to interact with the monitoring application directly, such that if a performance threshold is violated, the monitored application takes corrective action to correct the error.

Figure 4:
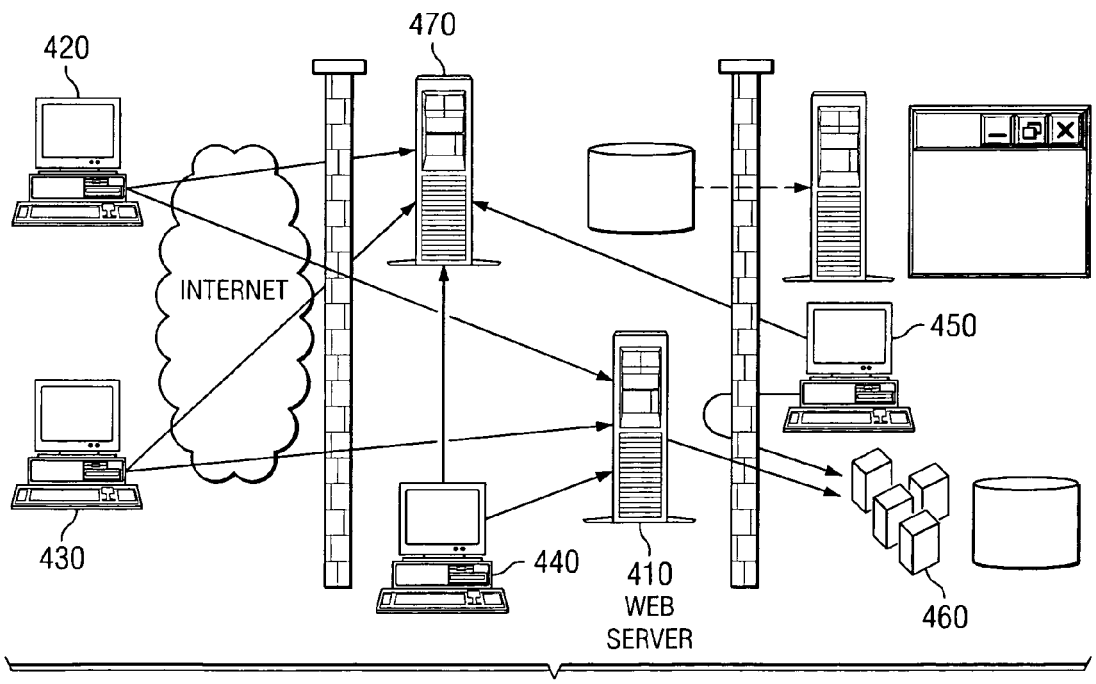
FIG. 4 is an exemplary diagram of an electronic business system in accordance with a known transaction performance monitoring architecture.

Turning now to FIG. 4, an exemplary diagram of an electronic business system in accordance with a known transaction performance monitoring architecture is shown. Client devices 420-450 may communicate with Web server 410 in order to obtain access to services provided by the back-end enterprise computing system resources 460. Transaction monitoring system 470 is provided for monitoring the processing of transactions by Web server 410 and enterprise computing system resources 460.

Web server 410, enterprise computing system resources 460 and transaction monitoring system 470 are all part of an enterprise system. Client devices 420-450 may submit requests to the enterprise system via Web server 410, causing transactions to be created. The transactions are processed by Web server 410 and enterprise computing system resources 460 with transaction monitoring system 470 monitoring the performance of Web server 410 and enterprise computing system resources 460 as they process the transactions.

This performance monitoring involves collecting and storing data regarding performance parameters of the various components of Web server 410 and enterprise computing system resources 460. For example, monitoring of performance may involve collecting and storing information regarding the amount of time a particular component spends processing the transaction, a SQL query, component information including class name and instance id in the JAVA Virtual Machine (JVM), memory usage statistics, any properties of the state of the JVM, properties of the components of the JVM, and/or properties of the system in general.

The components of Web server 410 and enterprise computing system resources 460 may include both hardware and software components. For example, the components may include host systems, JAVA Server Pages, servlets, entity beans, Enterprise Java Beans, data connections, and the like. Each component may have its own set of performance characteristics which may be collected and stored by transaction monitoring system 470 in order to obtain an indication as to how the enterprise system is handling transactions.

Turning now to FIG. 5, a diagram illustrating interactions between components for exposing monitoring violations to monitored applications is depicted in accordance with a preferred embodiment. As depicted in FIG. 5, in this example implementation, within performance monitoring environment 500, monitored application 501 resides on application server 502. Application server 502 may be implemented using an application server application 503, such as a WebSphere Application Server or a Microsoft NET platform, a product available from Microsoft Corporation.

When the user configures monitored application 501 to be monitored, the user deploys a monitoring component 506, such as J2EE monitoring component. Monitoring component 506 is deployed in application server application 503 to dynamically configure application server application 503 by weaving code into monitored application 501. Monitoring component 506 may be implemented using various aspect-oriented programming techniques, such as just-in-time-instrumentation (JITI), which is a specific implementation within transaction monitoring application, such as transaction monitoring system 470 in FIG. 4.

In addition, the user sets thresholds and a policy expected for the transaction, and an update of the policy and thresholds is then sent to monitoring engine 504 from management server 512 to set the policy or thresholds. In a preferred embodiment, monitoring engine 504, performance monitoring engine 508 and ARM engine 510 are implemented as part of management agent 514. Management agent 514 is a mechanism distributed among different components of performance monitoring environment 500, such as application server 502, for matching defined policy to the transactions. Management agent 514 may also reside on other components as described in FIG. 4, except the management server. When monitoring engine 504 receives the updated policy containing thresholds, monitoring engine 504 in turn notifies performance monitoring engine 508 if the thresholds are based on resources or ARM engine 510 if the thresholds are based on transaction response time.

At run time, monitored application 501 runs the monitored transaction and the monitoring component 506 generates the transaction by intercepting the call and invoking a 'start' method on performance monitoring engine 508 or 'ARM_ start' method on ARM engine 510. Performance monitoring engine 508 or ARM engine 510 then matches the transaction against defined policies in a policy mapper in monitoring engine 504 to see if the transaction is defined in a policy. If the transaction is defined, meaning that monitored application 501 is being monitored, monitoring engine 504 notifies ARM engine 510 or performance monitoring engine 508 to measure the performance of the transaction. In addition, if a violation of thresholds is encountered, ARM engine 510 or performance monitoring engine 508 automatically alerts monitoring application 501, such as transaction monitoring system 470 in FIG. 4, to take corrective action.

Furthermore, at run time, monitored application 501 may query the monitoring application for current transaction status using an interface provided by the present invention. Alternatively, this interface also provides a call back method for the monitoring application to notify the monitored application of the current transaction status. If the transaction status is greater than 0, meaning that a threshold is violated, monitored application 501 may take its own corrective action to abort the transaction. At this time, monitoring component 506 may intercept the abort transaction call and redirect the monitored application to execute an alternative code path.

If the transaction status is equal to 0, meaning that no threshold is violated, monitored application 501 may continue to finish the transaction. Monitoring component 506 may intercept once the transaction is complete to stop the transaction.

Figure 6:
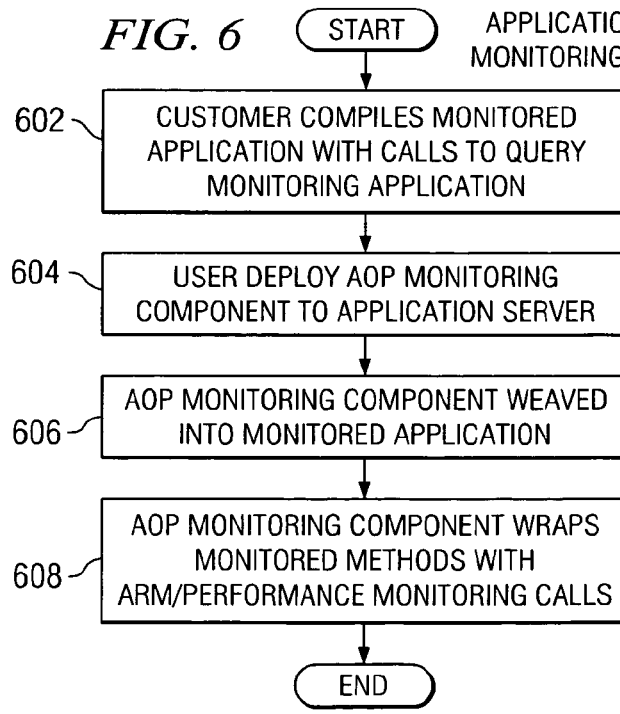
FIG. 6 is a flowchart of an exemplary process for configuring monitored application to interact with monitoring application in accordance with a preferred embodiment of the present invention.

Turning now to FIG. 6, a flowchart of an exemplary process for configuring monitored application to interact with monitoring application is depicted in accordance with a preferred embodiment of the present invention. As depicted in FIG. 6, the process begins when the user compiles a monitored application with monitoring component calls to query the monitoring application for transaction response time status (step 602). If no monitoring component calls are weaved into the monitored application, meaning that no monitoring component is deployed, the monitored component will not perform any function. Next, the user deploys the compiled monitored application with the monitoring component to the application server (step 604). The monitoring component calls are weaved into the monitored application when the class is loaded (step 606). The monitoring component may be weaved into the monitored application by using aspect-oriented programming techniques or other types of instrumentation techniques.

The monitoring component calls wrap monitored methods with monitoring engine calls (step 608), for example, ARM_ start or ARM_stop methods. The methods are wrapped such that the monitoring component may maintain transaction correlation at run time. Thus, the process terminates thereafter.

Figure 7A:
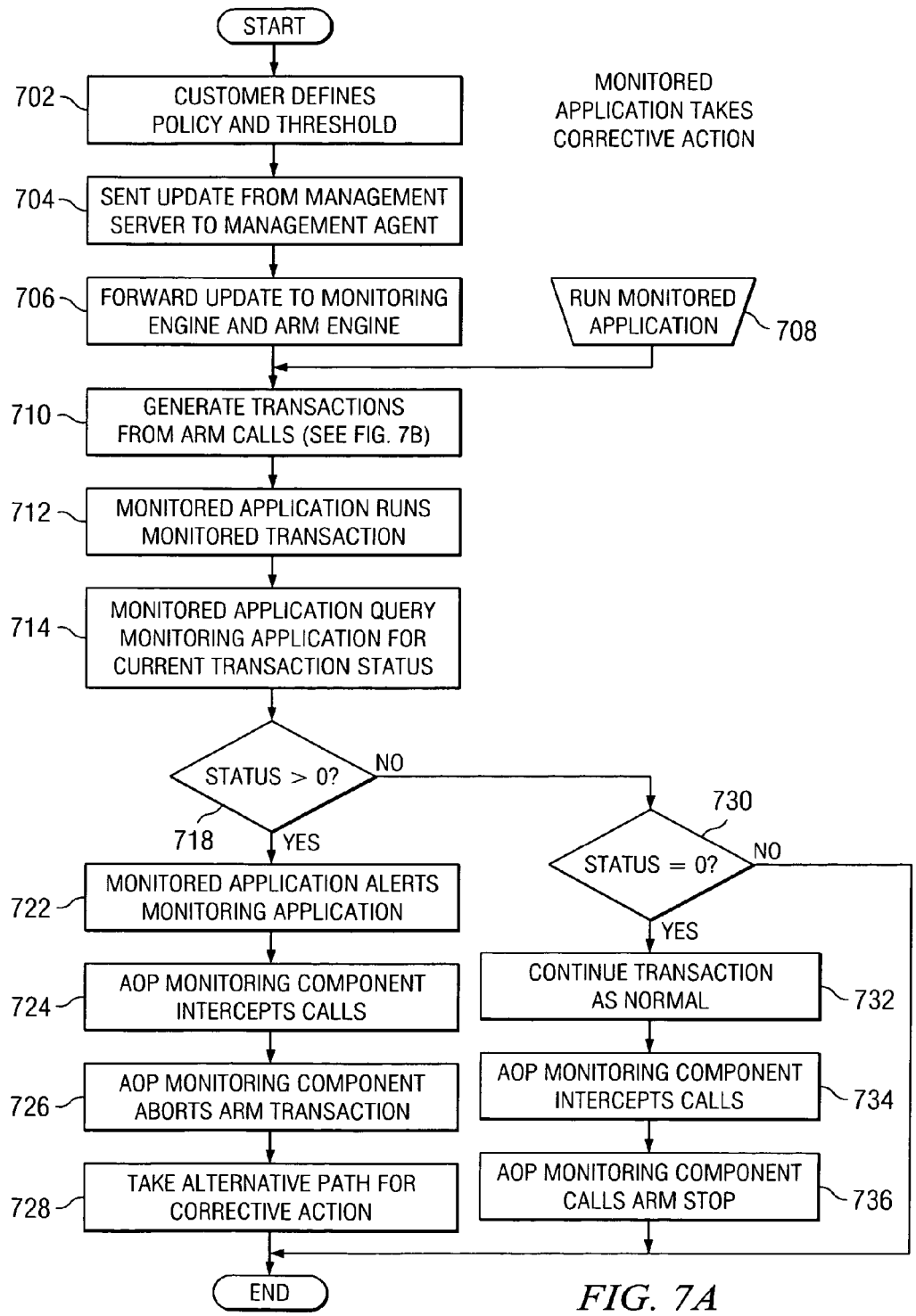
FIG. 7A is a flowchart of an exemplary process of how monitored application takes corrective action in accordance with a preferred embodiment of the present invention.

Turning now to FIG. 7A, a flowchart of an exemplary process of how monitored application takes corrective action is depicted in accordance with a preferred embodiment of the present invention. This process is performed after the process as described in FIG. 6. As depicted in FIG. 7A, the process begins when the user defines a policy and sets thresholds associated with a transaction in the monitoring application (step 702) that matches the transaction location in the monitored application. The user may define the policy and thresholds by using a graphical user interface.

Next, the policy and threshold information is sent from the management server to the management agent (step 704), which in turn forwards the update to the monitoring engine and the ARM engine (step 706).

When the user runs the monitored application (step 708), transactions are generated from the monitoring engine calls that are inserted by the monitoring component previously (step 710). This step is described in further detail in FIG. 7B.

The monitored application then runs the monitored transaction (step 712) and queries the monitoring application for a current transaction status (step 714). Alternatively, the monitored application sends an object via a call back method of an interface provided by the present invention. The object may be used by the monitoring application to notify the monitored application of the current transaction status. Next, a determination is made by the monitored application as to whether the current transaction status is greater than 0, which indicates that the transaction is in a violation state (step 718).

If the status code is greater than 0, a violation of the threshold has occurred and the monitored application alerts the monitoring application to take corrective action (step 722). On the other hand, the monitoring application may take its own corrective action if the monitoring component is weaved to intercept the call (step 724) and aborts the transaction (step 726), such that an alternative code path may be taken for corrective action (step 728). The monitoring component may abort the transaction by invoking an 'ARM_abort' method. Thus, the process terminates thereafter.

In addition to aborting the transaction or taking alternative code path, the monitored application may change the logic within to behave differently based on its performance, generate exceptions to be handled by another component of the monitored application if it is performing poorly, redirect to alternative or backup resources downstream of performance problem, generate alternate functionalities instead of performing full functionalities, restart resources downstream, and restart itself.

Turning back to step 718, if the status code is not greater than 0, a determination is then made by the monitored application as to whether the status code is equal to 0 (step 730). If the status code is equal to 0, meaning that the transaction is not in a violation state, the monitored application continues with the transaction as normal (step 732) until the transaction is complete or when the user stops the transaction. When the transaction is complete, if the monitoring component is weaved into the monitored application, the monitoring component may intercept the call (step 734) and stop the transaction by invoking an 'ARM_stop' method (step 736) at the end of the transaction. Thus, the process terminates thereafter.

Figure 7B:
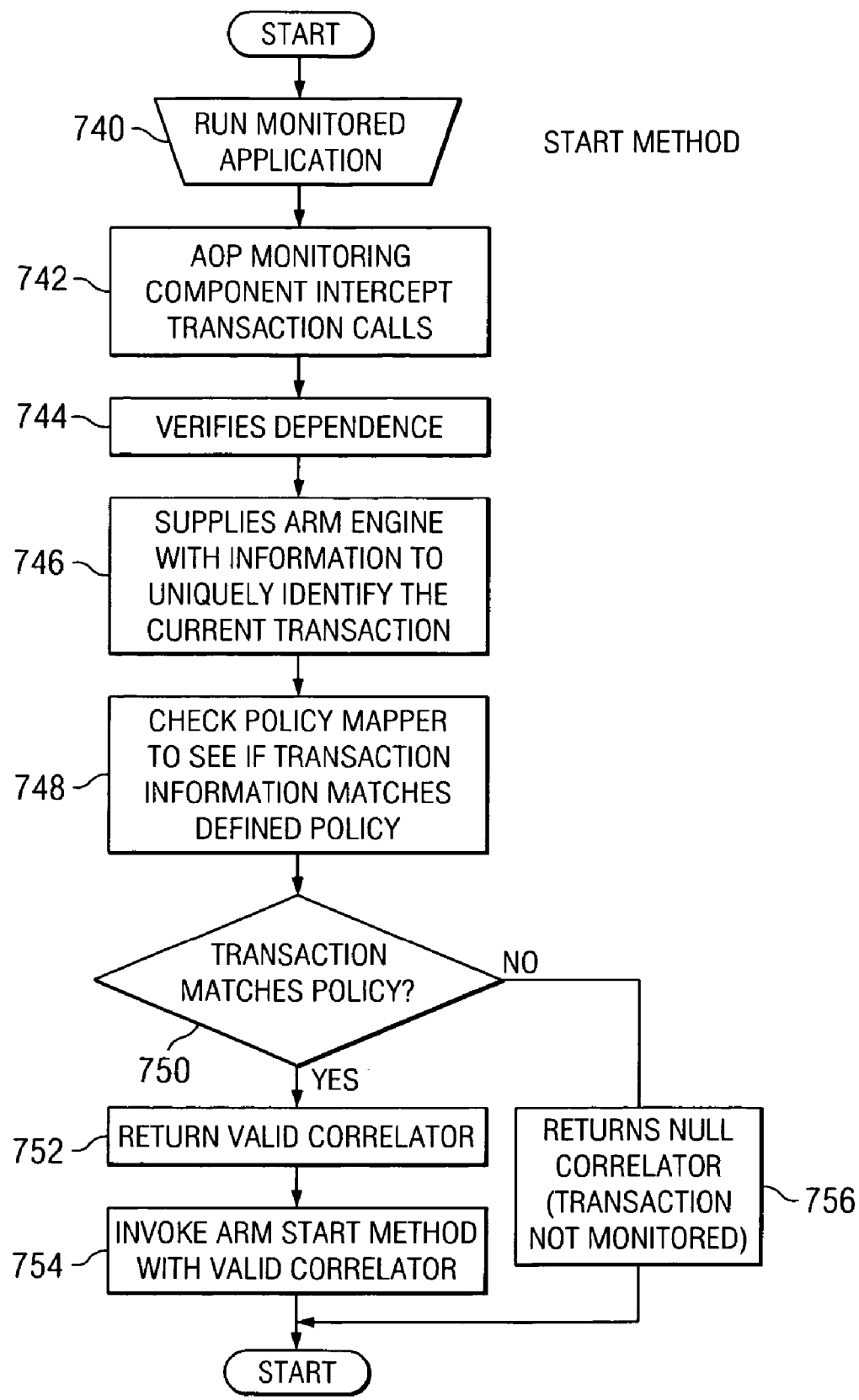
FIG. 7B is a flowchart of an exemplary process for generating transactions with the monitoring component in accordance with a preferred embodiment of the present invention.

Turning now to FIG. 7B, a flowchart of an exemplary process for generating transactions with the monitoring component is depicted in accordance with a preferred embodiment of the present invention. This process describes step 710 in further detail. As depicted in FIG. 7B, the process begins when the user runs the monitored application (step 740). Next, if the monitoring component is weaved into the monitored application, the monitoring component intercepts the transaction call (step 742) and verifies that all dependencies exist (step 744).

If all dependencies exist, the monitoring component supplies the ARM engine or performance monitoring engine with information necessary to uniquely identify the current transaction (step 746). The monitoring component then queries the ARM engine or performance monitoring engine for a correlator. The correlator is used to link all the transactions or sub-transactions together.

The monitoring component queries the ARM engine or performance monitoring engine by checking a policy mapper in the monitoring engine to see if the transaction information matches a currently defined policy (step 748). Thus, a determination is made by the monitoring component as to whether the transaction matches the defined policy (step 750).

If the policy matches, the ARM engine or performance monitoring engine returns a valid correlator (step 752). The monitoring component then invokes a 'ARM_start' method on the ARM engine or 'start' method on the performance monitoring engine with the valid correlator (step 754). However, if no policy matches, the ARM engine or performance monitoring engine returns a null correlator (step 756). A null correlator is a special correlator that signifies to the monitoring component that the current transaction is not being monitored. Thus, the process terminates thereafter.

In summary, the present invention provides a mechanism of exposing monitoring violations to monitored applications. The present invention has advantages over the prior art, in that using the present invention, a monitored application may detect that a monitoring application has been applied to a transaction.

In addition, the present invention provides a generic interface that allows a monitored application to interact with a monitoring application for detection of a violation state. The generic interface allows a monitored application to interact with a monitoring application and a performance monitoring engine to start, stop, abort transactions and return a transaction status based on a transaction identifier. Alternatively, a call back method may be provided by the interface for the monitoring application to notify the monitored application of the transaction status.

Furthermore, in addition to alerting the monitoring application, the present invention allows the monitored application to autonomically take corrective action upon detection of a violation state. For example, the monitored application may stop the transaction that queries the database and reroute the request to a different database via an alternative code path. In addition, the monitored application may change the logic within to behave differently based on its performance, generate exceptions to be handled by other components in the monitored application if it is performing poorly, redirect to alternative or backup resources downstream of performance problem, generate alternate functionalities instead of performing full functionalities, restart resources downstream, and restart itself. In this way, a monitored application may make adjustments to its own performance at run time.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution.

Examples of computer readable media include recordable-type media, such as a floppy disk, a hard disk drive, a RAM, CD-ROMs, and DVD-ROMs. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for exposing monitoring violations to a monitored application, the method comprising:

configuring, by a processor of an application server, a monitored application to interact with a monitoring application, wherein configuring a monitored application comprises:

receiving, by the processor, a monitoring component from a user;

inserting code into the monitored application using the monitoring component; and receiving, by a performance monitoring engine of the processor, at least one policy and at least one threshold defined by the user, wherein the at least one policy and the at least one threshold is associated with a transaction in the monitored application;

initiating the transaction in the monitored application, wherein initiating the transaction comprises:

generating the transaction using the code inserted into the monitored application using the monitoring component;

matching the transaction against the at least one policy and determining if the at least one policy matches the transaction, wherein determining if the at least one policy matches the transaction comprises examining a policy mapper in a management agent to determine if the transaction is defined in the at least one policy;

in response to determining that the at least one policy matches the transaction:

returning a valid Application Response Measurement correlator; and invoking a start method on the performance monitoring engine using the valid Application Response Measurement correlator;

the monitoring application querying the monitored application for a status of the transaction at the monitored application, wherein querying a status of the transaction comprises retrieving a status code from the performance monitoring engine;

the monitored application determining whether the transaction is in a violation state based on the status at the monitored application, wherein the transaction is determined to be in a violation state if the status code is determined to be greater than zero, and wherein the transaction is determined to not be in a violation state if the status code is determined to be equal to zero;

in response to determining that the status code is greater than zero such that the transaction is in a violation state, taking corrective actions to correct a violation, wherein taking corrective actions to correct a violation comprises:

the monitored application alerting the monitoring application of the violation;

the monitoring application aborting the transaction using the code inserted into the monitored application by the monitoring component, wherein the code invokes an abort method on the performance monitoring engine; and taking an alternative code path to correct the transaction; and in response to determining that the status code is not greater than zero:

determining whether the status code is equal to zero; and in response to determining that the status code is equal to zero such that the transaction is not in a violation state, continuing with the transaction until the transaction is completed.

2. A data processing system for exposing monitoring violations to a monitored application, the data processing system comprising:

an application server having a processor, the processor comprising:

configuring means for configuring a monitored application to interact with a monitoring application, wherein the configuring means comprises:

means for receiving a monitoring component from a user means for inserting code into the monitored application using the monitoring component; and means for receiving, by a performance monitoring engine of the processor, at least one policy and at least one threshold defined by the user, wherein the at least one policy and the at least one threshold is associated with a transaction in the monitored application;

means for initiating the transaction in the monitored application, wherein the initiating means comprises:

means for generating the transaction using the code inserted into the monitored application using the monitoring component;

means for matching the transaction against the at least one policy and determining if the at least one policy matches the transaction, wherein the means for determining if the at least one policy matches the transaction comprises means for examining a policy mapper in a management agent to determine if the transaction is defined in the at least one policy;

in response to determining that the at least one policy matches the transaction, means for returning a valid Application Response Measurement correlator; and means for invoking a start method on the performance monitoring engine using the valid Application Response Measurement correlator;

querying means for the monitoring application to query the monitored application for a status of the transaction at the monitored application, wherein the querying means comprises means for retrieving a status code from the performance monitoring engine;

determining means for the monitored application to determine whether the transaction is in a violation state based on the status at the monitored application, wherein the the transaction is determined to be in a violation state if the status code is determined to be greater than zero, and wherein the transaction is determined to not be in a violation state if the status code is determined to be equal to zero;

in response to determining that the status code is greater than zero such that the transaction is in a violation state, means for taking corrective actions to correct a violation, wherein the means for taking corrective actions comprises:

means for the monitored application to alert the monitoring application of the violation;

means for the monitoring application to abort the transaction using the code inserted by the monitoring component, wherein the code invokes an abort method on the performance monitoring engine; and means for taking an alternative code path to correct the transaction; and in response to determining that the code status is not greater than zero:

means for determining whether the status code is equal to zero; and in response to determining that the status code is equal to zero such that the transaction is not in a violation state, means for continuing with the transaction until the transaction is completed.

3. A computer program product, comprising:

a computer readable recordable-type medium storing computer usable instructions for exposing monitoring violations to a monitored application, the computer program product comprising:

first instructions for configuring, by a processor of an application server, a monitored application to interact with a monitoring application, wherein the first instructions comprises:

instructions for receiving, by the processor, a monitoring component from a user;

instructions for inserting code into the monitored application using the monitoring component; and instructions for receiving, by a performance monitoring engine of the processor, at least one policy and at least one threshold defined by the user, wherein the at least one policy and the at least one threshold is associated with a transaction in the monitored application;

second instructions for initiating the transaction in the monitored application, wherein the second instructions comprises:

instructions for generating the transaction using the code inserted into the monitored application using the monitoring component;

instructions for matching the transaction against the at least one policy; and instructions for determining if the at least one policy matches the transaction, wherein the instructions for determining if the at least one policy matches the transaction comprises instructions for examining a policy mapper in a management agent to determine if the transaction is defined in the at least one policy;

in response to determining that the at least one policy matches matching the transaction;

instructions for returning a valid Application Response Measurement correlator; and instructions for invoking a start method on the performance monitoring engine using the valid Application Response Measurement correlator;

third instructions for the monitoring application to query the monitored application for a status of the transaction at the monitored application wherein the third instructions comprises instructions for retrieving a status code from the performance monitoring engine;

fourth instructions for the monitored application to determine whether determining if the transaction is in a violation state based on the status at the monitored application, wherein the fourth instructions determines that the transaction is in a violation state if the status code is determined to be greater than zero, and that the transaction is not in a violation state if the status code is determined to be equal to not greater than zero;

in response to determining that the status code is greater than zero such that the transaction is in a violation state, fifth instructions for taking corrective actions to correct a violation, wherein the fifth instructions comprises:

instructions for the monitored application to alert alerting the monitoring application of the violation;

instructions for the monitoring application to abort aborting the transaction using the code inserted into the monitored application by the monitoring component, wherein the code invokes an abort method on the performance monitoring engine; and instructions for taking an alternative code path to correct the transaction;

and in response to determining that the transaction is not greater than zero:

sixth instructions for determining whether the status code is equal to zero; and in response to determining that the status code is equal to zero such that the transaction is not in a violation state, seventh instructions for continuing with the transaction until the transaction is completed.

* * * * *

UNITED STATES PATENT AND TRADEMARK OFFICE
CERTIFICATE OF CORRECTION

PATENT NO. : 7,631,073 B2 Page 1 of 1
APPLICATION NO. : 11/044465
DATED : December 8, 2009
INVENTOR(S) : Chagoly et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1352 days.

Signed and Sealed this

Second Day of November, 2010

David J. Kappos
*Director of the United States Patent and Trademark Office*